United States Patent [19]

Ben-Zwie

[11] 4,146,245
[45] Mar. 27, 1979

[54] SELF-PROPELLED VEHICLES

[76] Inventor: Yitzchak Ben-Zwie, 33 Hazalbanim St., Haifa, Israel

[21] Appl. No.: 825,394

[22] Filed: Aug. 17, 1977

[51] Int. Cl.² .............................................. B62K 5/02
[52] U.S. Cl. ................................... 280/206; 105/91; 280/87.2
[58] Field of Search ............... 280/206, 205, 207, 208, 280/210, 200; 180/10; 105/91, 92, 95

[56] References Cited

U.S. PATENT DOCUMENTS

| 480,585 | 8/1892 | Imlah | 280/206 X |
|---|---|---|---|
| 541,426 | 6/1895 | Detreux | 280/206 X |
| 919,070 | 4/1909 | Penteado | 280/206 X |
| 3,260,324 | 7/1966 | Suarez | 280/206 X |

FOREIGN PATENT DOCUMENTS

| 392164 | 3/1944 | France | 280/200 |
|---|---|---|---|
| 211964 of | 1924 | United Kingdom | 280/220 |

*Primary Examiner*—Joseph F. Peters, Jr.
*Assistant Examiner*—Terrance L. Siemens
*Attorney, Agent, or Firm*—Benjamin J. Barish

[57] ABSTRACT

A self-propelled cycle-type vehicle comprises a drive wheel rotatably supported by the vehicle frame and coupled to the vehicle foot pedals; a planetary wheel of larger diameter than the drive wheel and rotatably supported by the frame around the drive wheel, with the outer face of the drive wheel engageable with and rollable along the inner face of the planetary wheel, the outer face of the planetary wheel being rollable along the surface over which the vehicle is propelled; and a balancing wheel also rotatably supported by the frame and having an outer face rollable along the surface over which the vehicle is propelled.

Two embodiments of the invention are described for propelling the vehicle along the ground, and a third embodiment is described for propelling the vehicle along railroad tracks.

6 Claims, 4 Drawing Figures

SELF-PROPELLED VEHICLES

BACKGROUND OF THE INVENTION

The present invention relates to new forms of self-propelled vehicles particularly of the cycle-type.

BRIEF SUMMARY OF THE INVENTION

According to the invention, there is provided a self-propelled vehicle comprising a frame including a seat for the operator of the vehicle; foot pedals rotatable by the operator; a drive wheel rotatable by the frame and coupled to the foot pedals to be rotated thereby; and a planetary wheel of larger diameter than the drive wheel and rotatably supported by the frame around the drive wheel, with the outer face of the drive wheel engagable with and rollable along the inner face of the planetary wheel, the outer face of the planetary wheel being rollable along the surface over which the vehicle is propelled. The vehicle further includes a balancing wheel also rotatably supported by the frame and having an outer face rollable along the surface over which the vehicle is propelled.

In the preferred embodiments of the invention described below, the planetary wheel is rotatably supported at three points, two points being constituted by two rollers carried by the frame and engageable with the inner face of the planetary wheel, the third point being the lower end of the drive wheel engageable with the inner face of the planetary wheel.

In one described embodiment, the planetary wheel is of a diameter of 0.5 to 1.0 meters; and in a second described embodiment, the planetary wheel is of a diameter, greater than 1.0 meters, for example about 2 meters, so as to encircle the operator sitting in the driver's seat.

In a third described embodiment, the planetary and balancing wheels both include concave outer faces for propelling the vehicle over railroad tracks. In this embodiment, the planetary and balancing wheels are adapted to engage one track of a pair of railroad tracks, the vehicle frame further including stabilizers extending laterally of the planetary and balancing wheels, and adapted to engage the other track of the pair, for stabilizing the vehicle as it is propelled along the railroad tracks.

Further features of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
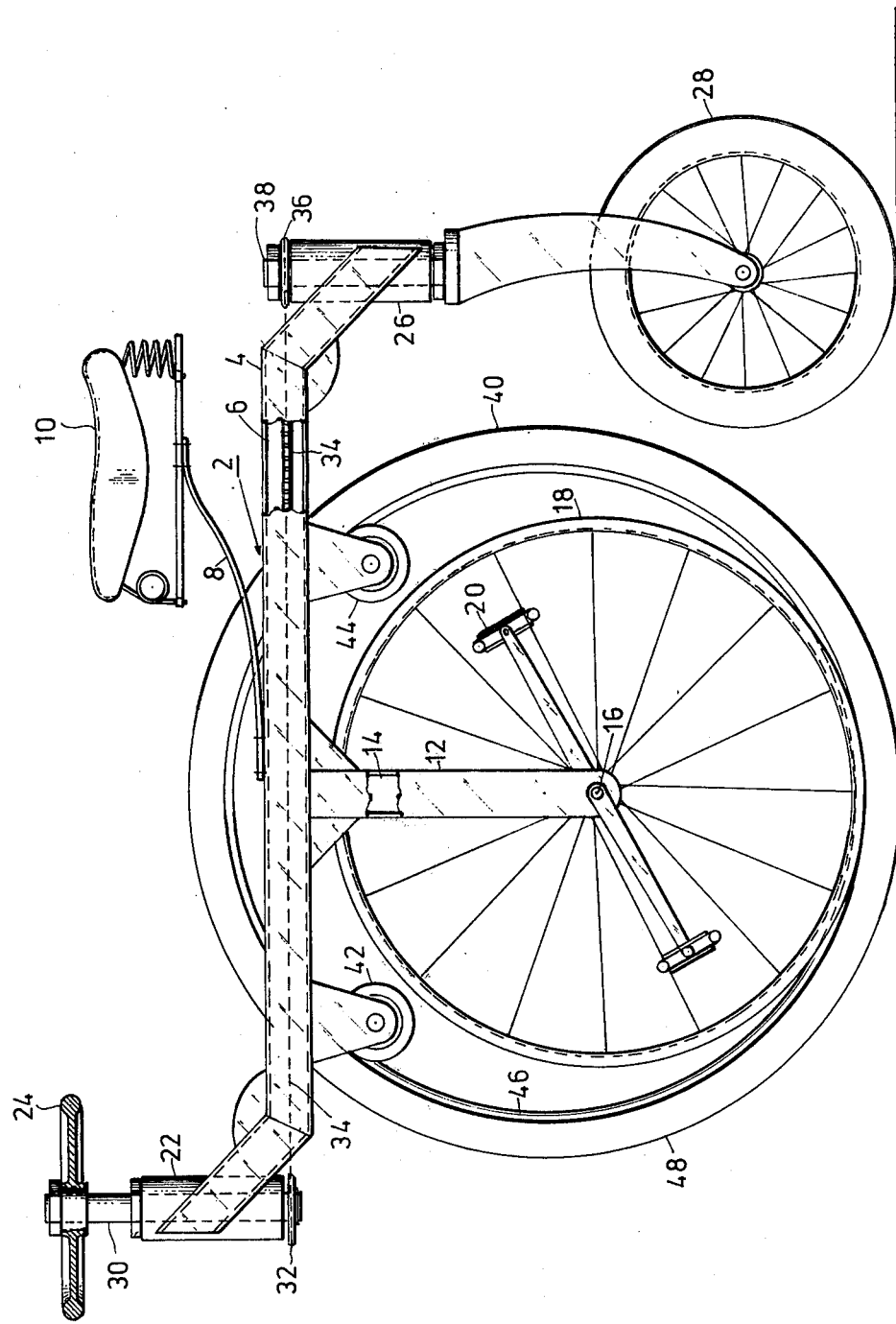
FIGS. 1–3 illustrate three embodiments of self-propelled cycle-type vehicles constructed in accordance with the invention, FIGS. 1 and 2 illustrating two vehicles adapted to be propelled over the ground, and FIGS. 3 and 3a illustrating a third vehicle adapted to be propelled over railroad tracks.

The embodiment of the invention illustrated in FIG. 1 comprises a frame, generally designated 2, including two spaced horizontal bar sections 4, 6 carrying at their upper ends a support 8, e.g. a leaf-spring, supporting a seat 10 for the operator of the vehicle. At their lower ends, the two frame sections 4 and 6 are provided with vertically-depending depending bars 12, 14, which support between them an axle 16 for a drive wheel 18, the latter being a spoked wheel and including foot pedals 20 rotatable by the operator occupying the vehicle seat 10. At the front of the vehicle, the two frame sections 4 and 6 are joined to a vertical tube 22 rotatably supporting a steering device in the form of a steering wheel 24; and at the rear end of the vehicle, the two frame sections 4 and 6 are joined to another vertical tube 26 rotatably supporting a small balancing wheel 28. Steering wheel 24 is secured to a shaft 30 journalled within tube 22 and connected, at its lower end, to a sprocket wheel 32. The latter is coupled via a sprocket chain 34 to another horizontal sprocket wheel 36 carried at the upper end of a shaft 38 journalled within vertical tube 26, the balancing wheel 28 being carried at the lower end of shaft 38. It will be seen that manually rotating steering wheel 24 will turn the small balancing wheel 28 by means of the sprocket and cable connection 32, 34 and 36.

A planetary wheel 40 is rotatably supported by frame 2 at three points. Two points of support are constituted by a pair of rollers 42, 44 supported by the two frame sections 4, 6 and engageable with the inner face of the planetary wheel 40; and the third point of support is effected by the outer face of drive wheel 18 which is engageable with and rollable along the inner face of the planetary wheel 40. For this purpose, the outer face of drive wheel 18 is of concave configuration, and the inner face of the planetary wheel 40 includes a cylindrical pipe 46 complementary to the inner face of the drive wheel. The outer face of the planetary wheel 40 includes a rubber tire 48, rollable along the surface, for example the ground, over which the vehicle is propelled.

The manner of using the vehicle illustrated in FIG. 1 will be apparent from the above description. Thus, the operator sits in the vehicle seat 10 and rotates the foot pedals 20 by his feet. This causes wheel 18 to be driven around the inner face of the planetary wheel 40, thereby causing the planetary wheels to roll along the ground and to propel the vehicle. Steering is effected by the use of steering wheel 24 which, by virtue of the chain and sprocket connection (elements 32, 34, 36), causes the small balancing wheel 28 to turn, thereby steering the vehicle from the rear.

It will be appreciated that the vehicle illustrated in FIG. 1 could use conventional hand-brakes (not shown) which act preferably directly on the inner pipe 46 of the planetary wheel 40.

Figure 2:
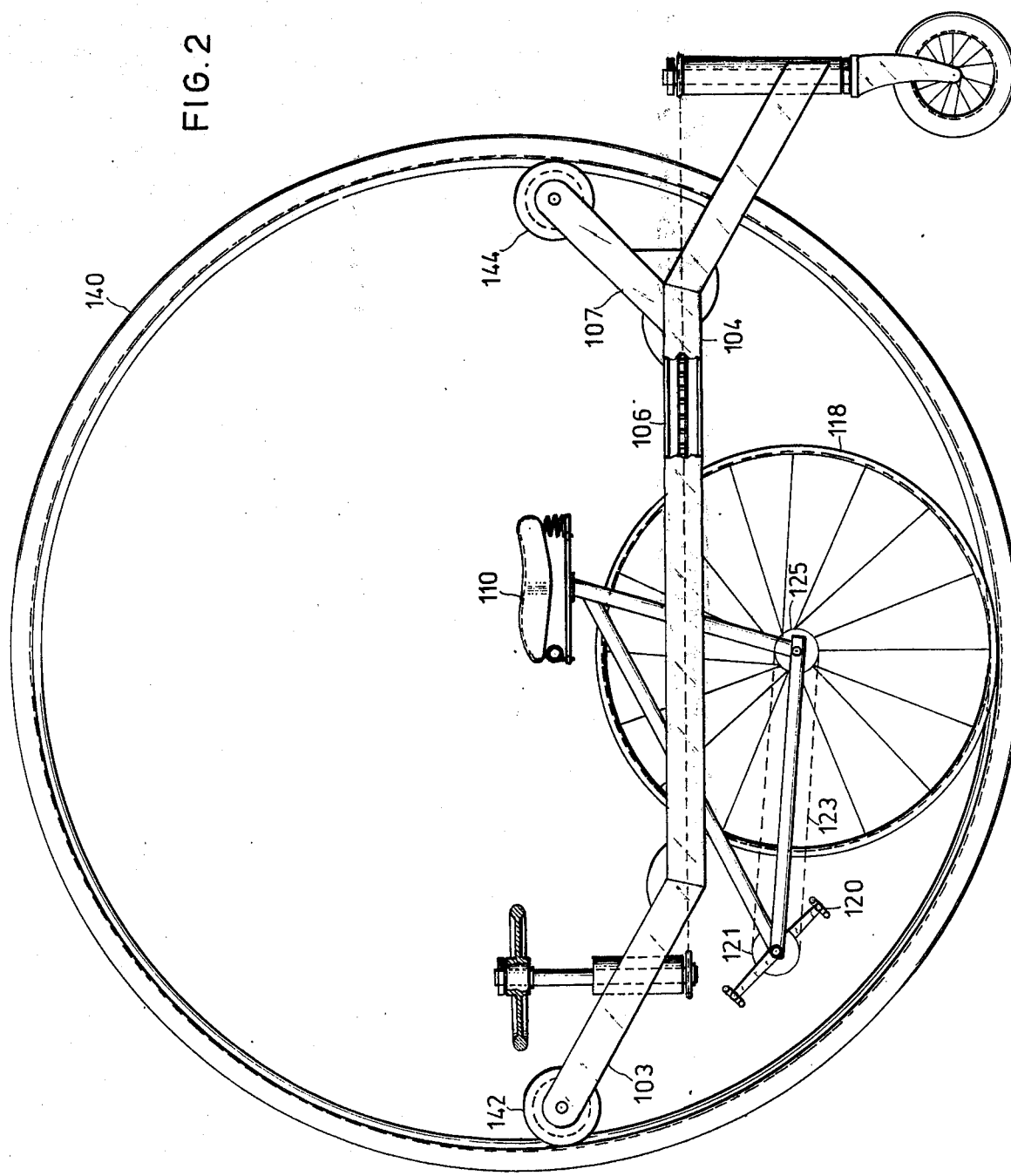

FIG. 2 illustrates a self-propelled vehicle similar to that of FIG. 1 but including a number of variations. Thus, both the drive wheel 120 and the planetary wheel 140 in FIG. 2 are of substantially larger diameter than in the vehicle of FIG. 1. For example, in the vehicle of FIG. 1, the drive wheel 18 could be about 60 cm in diameter and the planetary wheel 40 about 80 cm in diameter; whereas in FIG. 2, the drive wheel 120 is about 80 cm in diameter, and the planetary wheel 140 is about 2 meters in diameter, to thereby normally encircle the occupant sitting on the vehicle seat 110.

Because of the large diameter of the planetary wheel 140 in the embodiment of FIG. 2, the two rollers 142, 144 constituting two of the three-point support for the planetary wheel 140, are carried by extensions 103 and 107 at the front and rear ends, respectively, of the two frame sections 104, 106. The third point of support of the planetary wheel 140 is the lower end of the drive wheel 118, as in the FIG. 1 embodiment.

In addition, the foot pedals 120 in the embodiment of FIG. 2 are not coupled directly to the drive wheel 118, as in the FIG. 1 embodiment, but rather are coupled to a sprocket wheel 121 which is, in turn, coupled to the drive wheel 118 via a sprocket chain 123 and another sprocket wheel 125. It will be appreciated that a chain-and-sprocket arrangement could also be used in the FIG. 1 embodiment for coupling the foot pedals to the drive wheel.

The steering arrangement and the mode of operation of the vehicle illustrated in FIG. 2 are otherwise substantially the same as described above with respect to FIG. 1.

Figure 3:
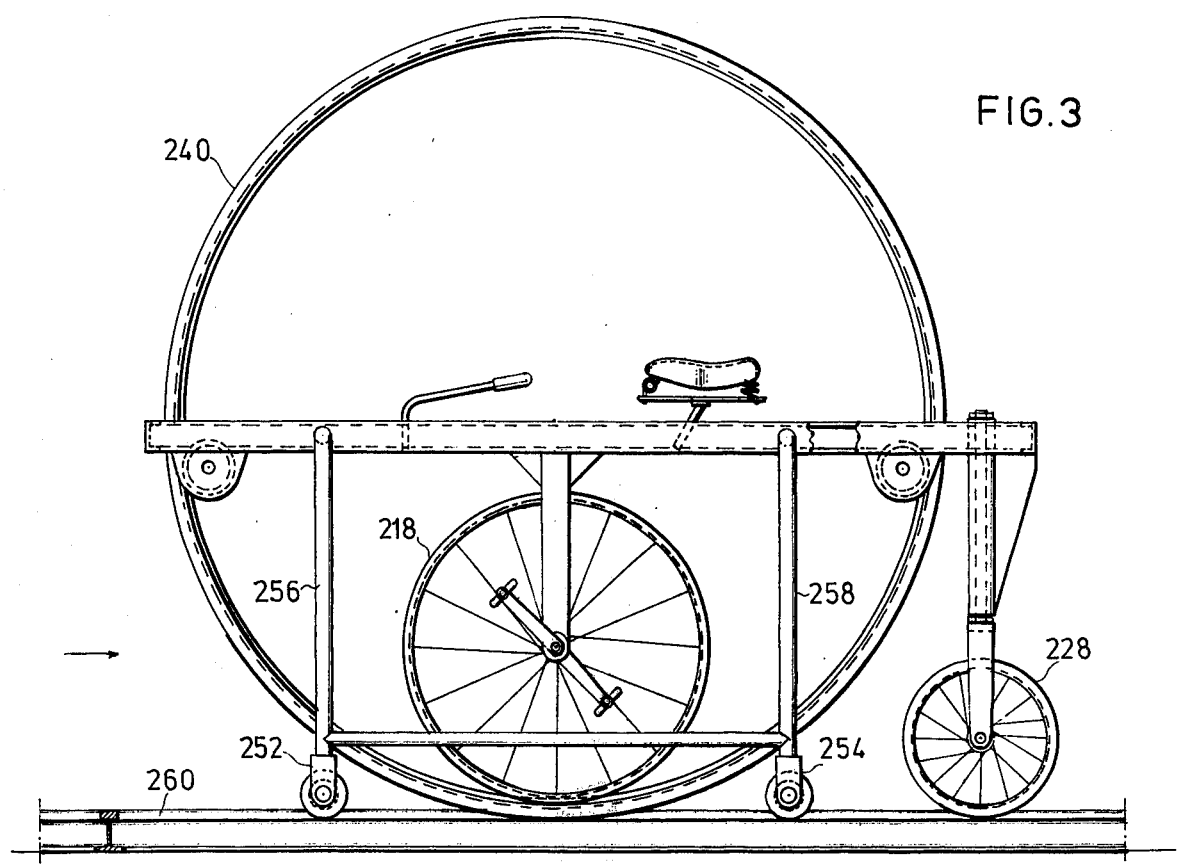
Figure 3A:
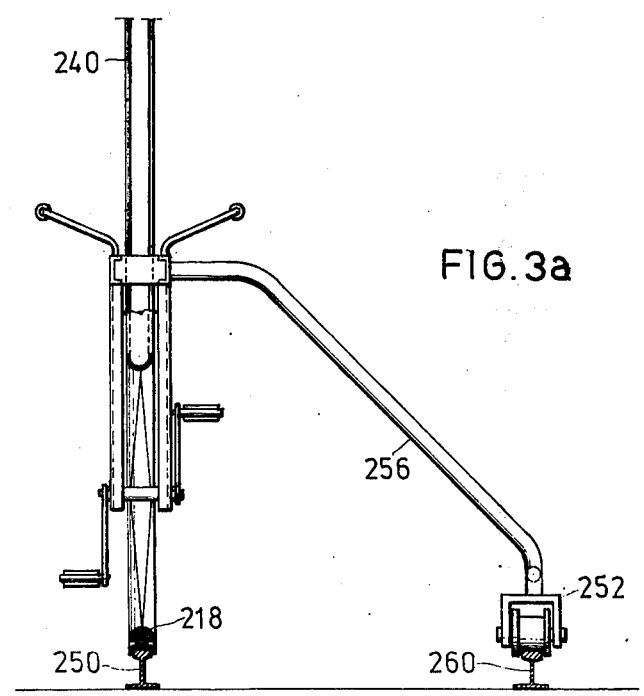

FIG. 3 illustrates a further form of self-propelled vehicle similar to that of FIG. 2 but adapted to be propelled along railroad tracks. The construction of the vehicle in FIG. 3 is similar to that of FIG. 2, including the drive wheel 218, the small balancing wheel 228, the steering device (in the form of handle bars), and the planetary wheel 240. In FIG. 3, however, the planetary wheel 240 and the balancing wheel 228 both include concave outer faces for engagement with the convex outer face of one of the railroad tracks 250. In addition, the vehicle frame carries a pair of stabilizers 252, 254, at the outer ends of arms 256, 258 extending laterally of the frame, the stabilizers being engageable with the other railroad track 260 for stabilizing the vehicle as it is propelled along the two railroad tracks 250, 260.

Many other variations, modifications and applications of the invention will be apparent.

What is claimed is:

1. A self-propelled vehicle, comprising: a frame including a seat for the operator of the vehicle; foot pedals rotatable by the operator; a drive wheel rotatably supported by the frame and coupled to said foot pedals to be rotated thereby; a planetary wheel of larger diameter than said drive wheel and rotatably supported by said frame around said drive wheel, with the outer face of the drive wheel engageable with and rollable along the inner face of the planetary wheel; the outer face of the planetary wheel being rollable along the surface over which the vehicle is propelled; a balancing wheel also rotatably supported by the frame and having an outer face rollable along the surface over which the vehicle is propelled; and a steering device manipulatable by the operator and having a coupling to said balancing wheel for steering same; said steering device being supported at the front of the frame, and said balancing wheel being supported at the rear of the frame in alignment with the drive and planetary wheels.

2. A vehicle according to claim 1, wherein said planetary wheel is rotatably supported at three points, two points being constituted by two rollers carried by said frame and engageable with the inner face of the planetary wheel, the third point being the lower end of the drive wheel engageable with the inner face of the planetary wheel.

3. A vehicle according to claim 2, wherein said frame includes two spaced sections bridged by said two rollers, said planetary wheel and drive wheel both being rotatably supported in alignment with each other in the space between said two frame sections.

4. A vehicle according to claim 1, wherein said planetary wheel is of a diameter of 0.5 to 1.0 meters.

5. A vehicle according to claim 1, wherein said planetary wheel is of a diameter greater than 1.0 meters to encircle the operator on the vehicle seat when propelling the vehicle.

6. A vehicle according to claim 1, wherein said balancing wheel is of smaller diameter than said drive wheel.

* * * * *